United States Patent [19]

Langhorst

[11] Patent Number: 5,742,146
[45] Date of Patent: Apr. 21, 1998

[54] DRIVE CIRCUIT FOR A SWITCHED RELUCTANCE MOTOR WITH IMPROVED ENERGY RECOVERY USING A COMMON DUMP CAPACITOR AND RECOVERING PHASE CIRCUIT

[75] Inventor: Phillip G. Langhorst, Crestwood, Mo.

[73] Assignee: MagneTek, Inc., Nashville, Tenn.

[21] Appl. No.: 753,920

[22] Filed: Dec. 3, 1996

[51] Int. Cl.⁶ .................... H02P 5/40; H02P 7/05
[52] U.S. Cl. .......... 318/701; 318/254; 318/138; 318/757
[58] Field of Search .................. 318/701, 702, 318/708, 709, 254, 139, 439, 696, 138, 762, 810

[56] References Cited

U.S. PATENT DOCUMENTS

| | | | |
|---|---|---|---|
| 3,854,077 | 12/1974 | Greenwell | 318/227 |
| 4,348,619 | 9/1982 | Ray et al. | 318/139 |
| 4,563,619 | 1/1986 | Davis et al. | 318/138 |
| 4,584,506 | 4/1986 | Kaszmann | 318/254 |
| 4,682,093 | 7/1987 | Murphy et al. | 318/701 |
| 4,684,867 | 8/1987 | Miller et al. | 318/701 |
| 5,115,181 | 5/1992 | Sood | 318/701 |
| 5,214,365 | 5/1993 | Bahn | 318/701 |
| 5,278,482 | 1/1994 | Bahn | 318/701 |
| 5,449,993 | 9/1995 | Davis | 318/701 |
| 5,548,196 | 8/1996 | Lim | 318/701 |

OTHER PUBLICATIONS

A Page From "Switched Reluctance Motors and Their Control" Chapter 6 by T.J. Miller.

*Primary Examiner*—Paul Ip
*Attorney, Agent, or Firm*—Waddey & Patterson; Mark J. Patterson

[57] ABSTRACT

A drive circuit for a switched reluctance motor has phase circuits connected to a common dump capacitor which receives residual magnetic energy from each phase coil when it is switched off. One or more recovering phase circuits are connected to the dump capacitor and comprise a controlled switch and diode whereby energy stored in the dump capacitor is returned to a recovering phase coil in sequence.

7 Claims, 1 Drawing Sheet

DRIVE CIRCUIT FOR A SWITCHED RELUCTANCE MOTOR WITH IMPROVED ENERGY RECOVERY USING A COMMON DUMP CAPACITOR AND RECOVERING PHASE CIRCUIT

BACKGROUND OF THE INVENTION

This invention pertains generally to drive circuits for switched reluctance motors and more particularly to drive circuits which are capable of recovering magnetic energy stored in the phase windings of the motor.

In a conventional switched reluctance motor (SRM), there are phase windings on the stator of the motor but no windings on the rotor. Torque in the motor is produced by a controlled switching of current in each phase winding in a predetermined sequence that is synchronized with the rotation of the rotor. A magnetic attraction force is produced between the rotor and stator poles as they approach each other. Current pulses synchronized with movement of the rotor can be generated by a drive circuit using a current switching device in series with each phase, such as a thyristor or transistor. Each time that a phase of the switched reluctance motor is switched on by activating a current switch in the drive circuit, current flows in the stator winding from a DC supply. Part of this energy is converted into mechanical energy causing the rotor to rotate. Another part of the energy is stored in a magnetic field. When the phase switch in the drive circuit is opened, part of the stored magnetic energy can be converted to mechanical output but, in many prior art switched reluctance motors, the energy efficiency is reduced because of unrecovered energy in the magnetic field.

One technique used in the prior art for recovery of residual magnetic energy is described in U.S. Pat. No. 4,684,867. In the prior art drive circuit of the '867 patent, residual magnetic energy is stored in a phase winding after that phase has been switched off and is "dumped" into a storage or "dump" capacitor. The charge accumulated in the dump capacitor can then be partially returned to the DC source through an inductor when a recovering energy switch S is closed.

U.S. Pat. No. 5,115,181 also illustrates use of a common energy recovery capacitor which is connected to the switched ends of motor phase coils through separate diodes. The capacitor stores energy for later return to the phase coils through a fourth switch.

U.S. Pat. No. 4,584,506 describes a rather complicated circuit in which energy is stored in a capacitor when its corresponding phase coil is turned off. When the coil is then switched on by a switch, an SCR also turns on. The capacitor then discharges and supplies energy to the coil (at the opposite end), allowing a more rapid current build-up in the coil.

Although these and other prior art SRM drive circuits are successful in recovering some of the residual magnetic energy from the motor phase windings, they also have disadvantages. For example, some of the prior art SRM drive circuits with energy recover features are complex and need substantially more components, thereby increasing the cost. Others do not go far enough in recovering energy because they cannot supply the recovering phase coil with alternating current.

What is needed, then, is a drive circuit for a switched reluctance motor which increases efficiency by recovering a higher percentage of the residual magnetic energy from the motor phase coils without sacrificing motor performance or substantially increasing component count and cost.

SUMMARY OF THE INVENTION

In the improved SRM drive circuit of this invention, the unswitched ends of each phase coil in the motor are directly connected to the positive terminal of the DC source. The switched ends of the coils are connected to a common dump capacitor through separate diodes. At least one recovering phase circuit is provided, having a second switch electrically connected between the switched end of the coil and the diode end of the capacitor. A second diode is connected across the second switch. Accordingly, residual magnetic energy from the phase coil is stored in the capacitor during an open-switch condition in a regular phase circuit. When a high limit voltage is reached in the capacitor, the switch in the recovering phase circuit closes. This builds current in the recovering phase coil.

DESCRIPTION OF THE PREFERRED EMBODIMENT

Figure 1:
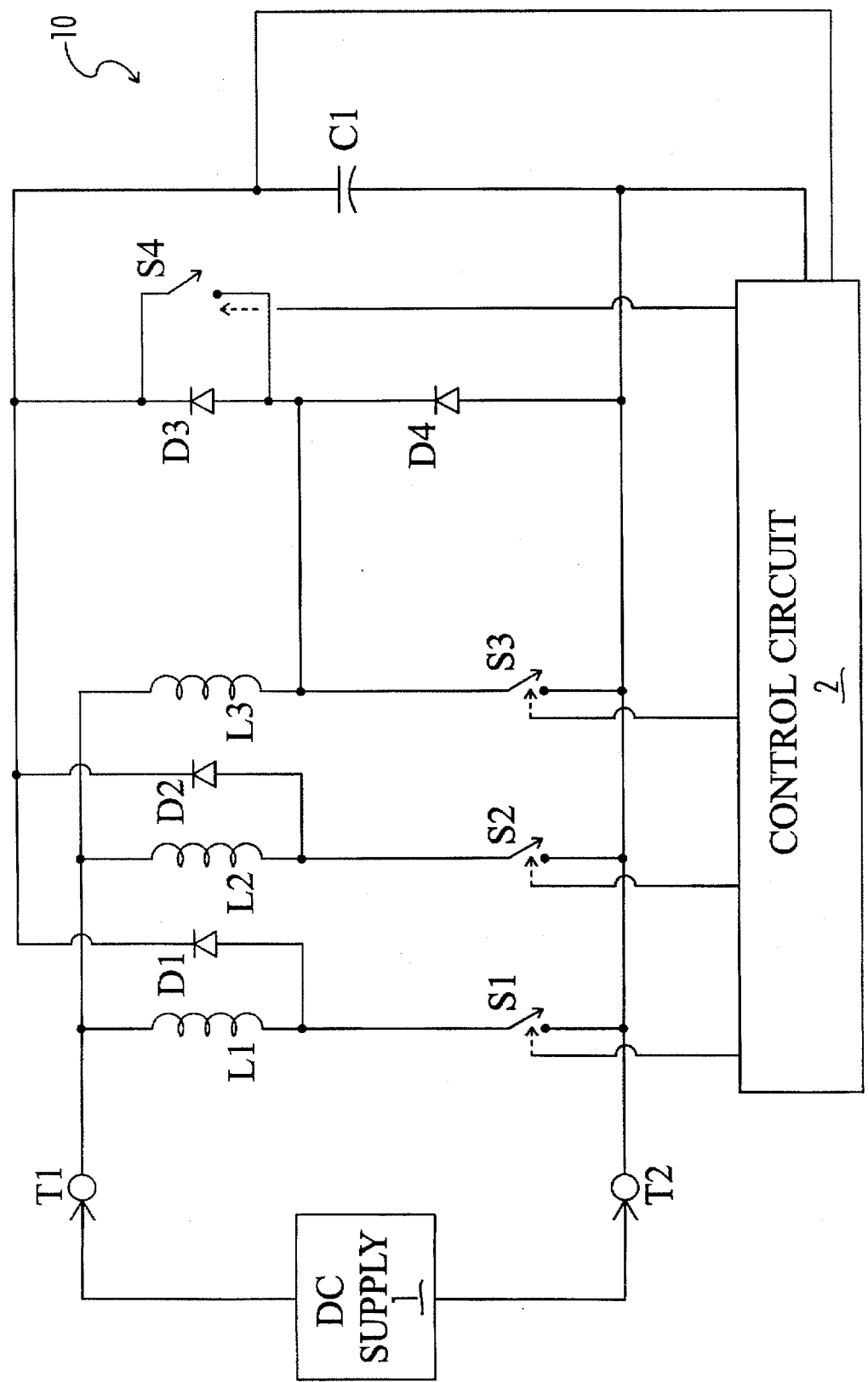
FIG. 1 is a schematic diagram of the SRM drive circuit of the present invention.

The SRM drive circuit with improved energy recovery is shown schematically at 10 in FIG. 1. The invention is used with a conventional polyphase switched reluctance motor. In the embodiment of the invention as illustrated, the SRM is a three-phase motor, having three phase coils L1, L2 and L3. Accordingly, the drive circuit 10 uses three primary phase circuits and one or more recovering phase circuits. For purposes of clarity, only one recovering phase circuit is shown in FIG. 1. although it will be apparent to those skilled in the art that the drive circuit 10 can be used with an SRM having greater or fewer than three-phases and that more than one recovering phase circuit can be used.

The primary and recovering phase circuits of drive circuit 10 are supplied by a common DC source 1 which is electrically connected to positive DC terminal T1 and negative DC terminal T2. The DC source 1 is entirely conventional, such as a full wave bridge rectifier circuit, and can supply either a smooth or pulsing DC voltage. Accordingly, each primary phase circuit of the drive circuit 10 includes a motor phase coil L1, L2 or L3, with one end of each coil connected to positive DC terminal T1. The other end of each phase coil L1, L2 and L3 is connect to a corresponding controlled primary phase switch S1, S2, or S3. Each primary phase switch S1, S2, and S3 is also conventional in nature and can be a transistor, thyristor or other controllable solid-state switching device capable of conducting the current which passes through its associated phase coil. The other terminal of each switch S1, S2, and S3 connects to negative DC terminal T2.

The switching or control terminal of each switch S1, S2, and S3, such as the base of a transistor, is electrically connected to a control circuit 2. Discrete or integrated circuitry usable for control circuit 2 is well known to those familiar with the electronic commutation of motors. In other words, the control circuit 2 will typically include timing circuits, inputs to receive shaft position and voltage level signals, a programmable logic unit which processes inputs and generates commands for the opening and closing of drive circuit switches, and interface circuits which supply the analog switch control signals in response to the commands from the logic unit.

To complete each primary phase circuit, the switched end of each primary phase coil L1, L2 and L3 is electrically connected to the anode of a corresponding diode D1, D2, or D3. The cathode of each diode D1, D2, and D3 electrically connects to a first side of a common dump capacitor C1. The second side of the dump capacitor C2 is connected to the negative DC terminal T2.

The recovering phase circuit is shown on FIG. 1 in conjunction with phase coil L3. A controlled recovering phase switch S4 is connected between the switched side of the phase coil L3 and the first or diode side of the dump capacitor. A second diode D4 is added, with its anode connected to negative DC terminal T2 and the cathode connected to the switched side of the phase coil L3. Switch S4 is, like switches S1–S3, a transistor or similar solid state switching device, with its base or other control terminal connected to the control circuit 2.

In operation, each primary phase switch S1, S2, and S3 is closed in a controlled sequence as determined by logic programmed into control circuit 2. When a primary phase switch is closed, S2 for example, current builds in the corresponding phase coil L2. When the switch S2 opens, a current is produced which flows through the diode D1 into the dump capacitor C1. Preferably, the voltage across capacitor C1 is sensed by control circuit 2. When the voltage across the capacitor C1 reaches a pre-determined high limit, the recovering phase switch of the next recovering phase in sequence, S4 for example, closes. Current builds in the recovering phase coil L3 driven by the energy stored in dump capacitor C1, thereby reducing the voltage across the capacitor C1. Switch S4 then opens. The cycle repeats for each phase coil L1, L2 and L3. Accordingly, the drive circuit of this invention approaches the efficiency of prior art circuits but at much lower cost.

It is possible in some circumstances and operating conditions that, during the time period before the control circuit 2 causes S4 to close, the voltage across capacitor C1 may build to a dangerously high level. This problem can be addressed by using a larger capacitor or by incorporating logic in the control circuit 2 which can anticipate this condition and begin discharging capacitor C1 before it reaches its normal trigger threshold.

Thus, although there has been described a particular embodiment of a drive circuit for a switched reluctance motor with improved energy recovery using a common dump capacitor, it is not intended that such references be construed as limitations upon the scope of this invention except as set forth in the following claims.

What I claim is:

1. A drive circuit for a switched reluctance motor comprising:
   a. a first motor phase coil having a first end electrically connected to a first DC voltage supply terminal;
   b. a second motor phase coil having a first end electrically connected to the first DC voltage supply terminal;
   c. first switch means for connecting and disconnecting a switched end of the first phase coil to a second DC voltage supply terminal;
   d. second switch means for connecting and disconnecting a switched end of the second phase coil to the second DC voltage supply terminal;
   e. first conduction means for providing a current path from the switched end of the first phase coil to first end of a dump storage capacitor when the first switch means is in a disconnect position;
   f. second conduction means for providing a current path from the switched end of the second phase coil to the first end of the dump storage capacitor when the second switch means is in a disconnect position;
   g. third switch means for connecting and disconnecting the switched end of the second phase coil to the first end of the dump storage capacitor to provide a discharge path from the dump storage capacitor into the second phase coil when a voltage across the dump storage capacitor reaches a pre-determined level; and
   h. third conduction means for providing a current path from the switched end of the second phase coil to the second DC voltage supply terminal.

2. The drive circuit of claim 1 wherein the first, second, and third conduction means each comprise first, second, and third diodes respectively, with the anodes of the first and second diodes connected to the switched end of the corresponding first and second phase coils, and the anode of the third diode connected to the second DC voltage supply terminal.

3. The drive circuit of claim 2 further comprising control circuit means to control and time connection and disconnection of each of the first, second, and third switch means in a pre-determined control sequence of operation.

4. The drive circuit of claim 3 further comprising sensor means to sense the voltage across the dump storage capacitor and the control circuit means including processor means to adjust the pre-determined control sequence in response to the voltage across the dump storage capacitor.

5. A drive circuit for a three-phase switched reluctance motor having first, second, and third phase coils with unswitched ends connected to a positive terminal of a DC voltage source, comprising:
   a. first, second, and third controllable switches connected between corresponding switched ends of the first, second, and third phase coils and a negative terminal of the DC voltage source;
   b. first, second, and third diodes having each having an anode and a cathode, the anode of each first, second, and third diode connected to the switched end of the corresponding first, second, and third phase coils, and the cathode of each first second, and third diode connected to a first end of a dump storage capacitor;
   c. a fourth controllable switch connected across the third diode;
   d. a fourth diode having an anode and a cathode, the cathode of the fourth diode connected to the switched end of the third phase coil and the anode of the fourth diode connected to the negative terminal of the DC voltage source; and
   e. means to alternately open and close the first, second, third, and fourth switches in a predetermined sequence of operation whereby the motor will rotate and residual magnetic energy from one or more of the phase coils will be stored in the dump storage capacitor and then supplied to one or more phase coils from the dump storage capacitor.

6. A drive circuit for a switched reluctance motor comprising:
   a. a plurality of phase circuits, each of the phase circuits having a motor phase coil connected at an unswitched end to a positive DC supply terminal, a first diode having an anode connected to a switched end of the motor phase coil, first electronic switch means in circuit whereby a switched end of the phase coil is alternately connected to and disconnected from a negative DC supply terminal,
   b. a common dump capacitor having a first end connected to cathodes of the first diodes associated with each of the phase circuits, and a second end connected to the negative DC supply terminal;

c. one or more recovering phase circuits, each recovering phase circuit having second electronic switch means for connecting the switched end of a corresponding phase coil directly to the first end of the common dump capacitor and a second diode having an anode connected to the negative DC supply terminal and a cathode connected to the switched end of the corresponding phase coil; and d. control means in circuit with each of the phase circuits and recovering phase circuits to open and close the first and second electronic switch means to cause rotation of the motor and to temporarily store in the dump capacitor magnetic energy recovered from each phase coil when its corresponding first electronic switch means is opened and to return the recovered energy from the dump capacitor to a succeeding phase coil.

7. The drive circuit of claim 6 further comprising means to sense a voltage across the dump capacitor and to control operation of the recovering phase circuits in response to the sensed voltage.

* * * * *